(12) United States Patent
Saarinen et al.

(10) Patent No.: US 9,202,168 B2
(45) Date of Patent: Dec. 1, 2015

(54) METHOD AND SYSTEM FOR MULTI-IED EVENT ZONE IDENTIFICATION IN AN ELECTRICAL GRID

(71) Applicant: ABB Research Ltd., Zurich (CH)

(72) Inventors: Kari Saarinen, Vasteras (SE); Mirrasoul Mousavi, Cary, NC (US)

(73) Assignee: ABB Research Ltd., Zurich (CH)

( * ) Notice: Subject to any disclaimer, the term of this patent is extended or adjusted under 35 U.S.C. 154(b) by 309 days.

(21) Appl. No.: 13/750,469

(22) Filed: Jan. 25, 2013

(65) Prior Publication Data

US 2013/0198124 A1 Aug. 1, 2013

(30) Foreign Application Priority Data

Jan. 26, 2012 (EP) ...................................... 12152573

(51) Int. Cl.
*G06N 5/02* (2006.01)
*G06Q 10/08* (2012.01)

(52) U.S. Cl.
CPC ................ *G06N 5/02* (2013.01); *G06Q 10/087* (2013.01); *Y04S 10/56* (2013.01)

(58) Field of Classification Search
CPC .............................. G06N 5/02; G06Q 10/087
USPC ......................................... 706/46; 702/58–59
See application file for complete search history.

(56) References Cited

U.S. PATENT DOCUMENTS

| | | | | |
|---|---|---|---|---|
| 5,568,399 | A * | 10/1996 | Sumic | ............................ 700/293 |
| 8,000,910 | B2 | 8/2011 | Bickel | |
| 2003/0191610 | A1 * | 10/2003 | Chen et al. | ..................... 702/191 |
| 2004/0064260 | A1 * | 4/2004 | Padmanabhan et al. | ......... 702/19 |
| 2005/0114743 | A1 * | 5/2005 | Moorhouse | .................... 714/100 |
| 2006/0235574 | A1 | 10/2006 | Lapinski et al. | |
| 2009/0281740 | A1 * | 11/2009 | Stoupis et al. | ................... 702/58 |
| 2011/0144931 | A1 | 6/2011 | Smit | |
| 2012/0004867 | A1 * | 1/2012 | Mousavi et al. | ................ 702/58 |
| 2012/0004869 | A1 * | 1/2012 | Saarinen et al. | ................ 702/59 |
| 2012/0010830 | A1 * | 1/2012 | Saarinen et al. | ................ 702/58 |

FOREIGN PATENT DOCUMENTS

| | | |
|---|---|---|
| CA | 2320565 A1 | 3/2002 |
| WO | 2009151740 A1 | 12/2009 |
| WO | 2010077830 A2 | 7/2010 |

OTHER PUBLICATIONS

European Search Report Application No. EP 12 15 2573 Completed: Aug. 6, 2012 3 pages.

* cited by examiner

*Primary Examiner* — Jeffrey A Gaffin
*Assistant Examiner* — Dave Misir
(74) *Attorney, Agent, or Firm* — Whitmyer IP Group LLC

(57) ABSTRACT

A method of identifying at least one event zone subject to an event in a substation environment of an electrical grid. Thereby, data from multiple intelligent electronic devices can be synthesized in real-time whereby an operator can be presented with a single conclusion describing the event attributes thereby helping the operator to determine the mitigation actions as needed. The method includes receiving first event related data from the intelligent electronic devices, and based on the first event related data, determining whether the at least one monitoring zone subject to the event is a primary monitoring zone of at least one of the intelligent electronic devices or a non-primary monitoring zone for all of the intelligent electronic devices using ensemble decision making and probabilistic methods. It is also presented a system for carrying out the method.

20 Claims, 2 Drawing Sheets

METHOD AND SYSTEM FOR MULTI-IED EVENT ZONE IDENTIFICATION IN AN ELECTRICAL GRID

FIELD OF THE INVENTION

The present disclosure generally relates to power systems and in particular to identification of event zones in a substation environment in an electrical grid.

BACKGROUND OF THE INVENTION

The performance and reliability of medium voltage electricity distribution feeders has a significant impact on the quality of service offered by electric utility companies to their commercial, industrial, and residential customers. To that end, reliability of the service and continuity of supply sit on top of every utility's business objectives. Electrical outages, service disruptions, and grid disturbances are however inevitable. They do occur and they are costly to the utility and the society alike. A recent study performed by Lawrence Berkeley National Laboratory in the United States reports that unreliable electrical systems cost $80BUSD annually due to mainly large number of short disturbances. When interruptions occur, the utility's top priority is to address the outages as quickly as possible and restore the power to as many customers as possible.

The effectiveness of all network operations, particularly outage management, depends heavily on availability of information systems that deliver the right information to the right operator at the right time.

Asset failures and faults resulting in interruptions as well as normal network operations manifest themselves in voltage and current excursions which are called events. These events are captured by Intelligent Electronic Devices (IEDs) as raw data. The recorded raw waveforms are seldom utilized for real-time and accurate decision making due to the lack of time, resources, and appropriate tools.

In order to improve the controllability and reliability of electrical networks, increasing number of measurement points and various kinds of intelligent electrical devices are installed. Often times, there is a redundancy in data as for example IEDs electrically connected to the same bus may capture multiple manifestations of a single event.

Microprocessor-based digital systems including protection IEDs and sensors used in distribution networks produce a lot of raw data that need to be analysed and processed for various decisions making functions ranging from protection to monitoring to control actions. Most often, the digital systems are put in place to replace the legacy electromechanical systems and configured to deliver the same functionalities as their legacy counterparts did. As such, advanced data-based methods and decision support tools are not widely used leading to a substantial underutilization of digital data. In the midst of rising data volumes and shrinking engineering work force, it is increasingly infeasible for the grid operators to deal with this "data tsunami" and make an effective use of the data that is often correlated and redundant.

In particular, the raw data captured by IEDs as disturbance records are rarely of direct benefit beyond their occasional use by protection engineers. Traditionally, the analysis is strictly a manual process. One or more analysts would become familiar with the data and, with the help of statistical techniques, provide summaries and generate reports. However, such an approach is rapidly breaking down as the volume of the data grows so fast that manual analysis, even if possible, simply cannot keep pace.

SUMMARY OF THE INVENTION

The present inventors have previously developed a method able to automatically capture, analyse, and interpret feeder events that are captured by a single feeder protection IED installed on a medium voltage substation bus. By that method, the IED can determine the probability of an event taking place in the primary monitoring zone of the IED, in an adjacent monitoring zone i.e. a monitoring zone of the same medium voltage substation bus for a different feeder, or if the event occurred in the upstream monitoring zone, which is upstream of the power distribution network in the transmission network. Applications by the same inventors as for the present disclosure, relating to the single IED event zone identification method are US applications with U.S. application Ser. No. 13/155,249, entitled "System for Zone Identification in a Power Substation Environment;", U.S. application Ser. No. 13/155,274, entitled "Systems and Methods for Characterizing Fault-Clearing Devices;" and U.S. application Ser. No. 13/155,236, which are hereby incorporated by reference.

In view of the above, an object of the present disclosure is to provide a method for a real-time system that synthesizes data from multiple IEDs and provides the operator with a single conclusion describing the event thereby helping the operator to determine the mitigation actions.

Hence, in a first aspect of the present disclosure there is provided a method of identifying at least one event zone subject to an event, wherein the method comprises: receiving first event related data from intelligent electronic devices, and determining whether the at least one event zone subject to the event is a primary monitoring zone of at least one of the intelligent electronic devices or a non-primary monitoring zone for all of the intelligent electronic devices, a primary monitoring zone of an intelligent electronic device being a monitoring zone which that intelligent electronic device is assigned to monitor, a non-primary monitoring zone being either an event zone having a power level which differs from the power level monitored by the intelligent electronic devices or an adjacent monitoring zone to all of the electronic intelligent devices, wherein the determining comprises determining a conditional probability that the first event related data is a result of the event having occurred in an adjacent monitoring zone of all intelligent electronic devices; conditional probabilities for each intelligent electronic device that the first event related data is a result of the event having occurred in the primary monitoring zone of one of the intelligent electronic devices; conditional probabilities that the first event related data is a result of the event having occurred in a primary monitoring zone of more than one intelligent electronic device, each determined conditional probability thereby being associated with at least one event zone, and determining whether the event occurred in at least one primary monitoring zone or in a non-primary monitoring zone based on the conditional probabilities.

By means of the this method, it can be decided whether the event occurred in a primary monitoring zone of one or more intelligent electronic devices in environments comprising two or more intelligent electronic devices or in a non-primary monitoring zone.

An event is a result of asset failures and/or faults resulting in interruptions, or intentional network operations and switching manifesting themselves in voltage and current excursions.

One embodiment comprises determining a respective weighted probability value for each of the determined conditional probabilities based on prior probability that the event occurred in an adjacent monitoring zone for each intelligent electronic device, that the event occurred in a primary monitoring zone of one intelligent electronic device, that the event occurred in a primary monitoring zone for more than one intelligent electronic device, wherein the step of determining whether the event occurred in a primary monitoring zone or a non-primary monitoring zone is based on the highest value of the weighted probabilities.

By determining a respective weighted probability based on prior probabilities, more realistic probabilities can be determined, i.e. prior knowledge regarding events is taken into account. It is for instance less probable that the event occurred in all primary monitoring zones, i.e. in all monitored feeders, simultaneously. Therefore the weight, i.e. prior probability, for this situation should typically be set lower than the prior probability that the event occurred in only one of the feeders. Hence, the weighted probability of the event having occurred in all primary monitoring zones is typically lower than the non-weighted conditional probability of the event having occurred in all primary monitoring zones.

One embodiment comprises, in case the event occurred in at least one primary monitoring zone, identifying the at least primary monitoring zone in which the event occurred based on the association of the at least one primary monitoring zone with a weighted probability value.

The primary monitoring zone or primary monitoring zones in which the event occurred can thereby be determined. Each individual first event related data received from an intelligent electronic device may be seen as individual expert opinions of that intelligent electronic device, without taking into account the expert opinions of the remaining intelligent electronic devices set up in the bus system or feeder network of the distribution network. The present disclosure allows for synthesizing all expert opinions and selecting the most likely opinion. In particular all expert opinions are sent to a combiner, which can be seen as the system in which the method is performed, wherein a single conclusion regarding the events location is made. Thereby the burden of manually determining where the event occurred based on the manifolds of first event related data can be fully taken off the operator.

One embodiment comprises, in case the event occurred in a non-primary monitoring zone and all feeders are monitored by an intelligent electronic device, determining that the event occurred in the upstream monitoring zone. Since all feeders are monitored and the hypothesis is that the event occurred in an adjacent zone for all intelligent electronic devices, the probability of the event having occurred upstream in the transmission network is the most likely situation.

One embodiment comprises receiving second event related data, and in case the event occurred in a non-primary monitoring zone and not all feeders are monitored by an intelligent electronic device, determining a conditional probability that the first event related data is a result of the event having occurred in an adjacent monitoring zone for all intelligent electronic devices and a conditional probability that the first event related data is a result of the event having occurred in the upstream monitoring zone based on the second event related data, and determining whether the event occurred in an adjacent monitoring zone or the upstream monitoring zone based on the conditional probabilities. If not all feeders are monitored, an adjacent monitoring zone may not necessarily be upstream of the busbar system, i.e. in the upstream monitoring zone which is typically under the responsibility of the owner of the transmission network. An adjacent monitoring zone may in this case be a feeder which is not being monitored, i.e. a feeder which is not a primary monitoring zone of any IED. Thus, by means of the above steps, it can be determined whether the event occurred in an adjacent monitoring zone, in this case in a feeder not monitored by an IED, or in the upstream monitoring zone.

One embodiment comprises determining a weighted probability value for each of the determined second event related data conditional probabilities based on prior probability that the event occurred in an adjacent monitoring zone for each intelligent electronic device and that the event occurred in the upstream monitoring zone, wherein the step of determining whether the event occurred in an adjacent monitoring zone or upstream of the busbar system is based on the highest value of the weighted probabilities.

As explained above, by determining a respective weighted probability based on prior probabilities, more realistic probabilities can be determined.

In one embodiment the steps of determining the conditional probabilities involves determining a respective joint density function. By assuming that the individual first event related data provided by each of the IEDs, i.e. that the vector components of the concatenated individual first event related data, are statistically independent, joint density functions can be generated for each conditional probability to be determined in a simple way. The joint conditional probabilities for the first event related data vector can thereby be calculated by multiplying conditional probabilities of the coordinates of the first event related data. Computation of the conditional probabilities can thereby be simplified considerably.

In one embodiment the step of determining the weighted conditional probabilities involves determining a respective discriminant function.

In one embodiment, the determining of the conditional probabilities for each intelligent electronic device that the first event related data is a result of the event having occurred in the primary monitoring zone of more than one of the intelligent electronic devices comprises determining conditional probabilities for all primary monitoring zone combinations. Each combination is a hypothesis providing a conditional probability for the event having occurred simultaneously in two or more primary monitoring zones.

In one embodiment, the first event related data received from each intelligent electronic device comprises probabilities concerning the event being a primary monitoring zone event for that intelligent electronic device or an adjacent monitoring zone event for that intelligent electronic device. In this embodiment, the conditional probabilities that the event occurred in the primary monitoring zone of an IED or in adjacent monitoring zone of that IED can be calculated already in the IED prior to sending the data to a system which performs the present methods for determining a single conclusion of where the event occurred. The received first event related data in this case comprises probabilities which may be utilized in the present method by multiplication of individual probabilities to determine the conditional probabilities, assuming that the measurement data of the IEDs for determining the first event related data is statistically independent. This way the central computations can be performed more efficiently.

In a second aspect of the present disclosure, there is provided a computer program product comprising computer-executable components for causing a system to perform the steps recited according to the first aspect when the computer-executable components are run on a processing unit included in the system.

According to a third aspect of the present disclosure, there is provided a system for identifying at least one event zone subject to an event, wherein the system comprises: an input unit arranged to receive first event related data from intelligent electronic devices, and a processing unit arranged to determine whether the at least one event zone subject to the event is a primary monitoring zone of at least one of the intelligent electronic devices or a non-primary monitoring zone for all of the intelligent electronic devices, a primary monitoring zone of an intelligent electronic device being a monitoring zone which that intelligent electronic device is assigned to monitor, a non-primary monitoring zone being either an event zone having a power level which differs from the power level monitored by the intelligent electronic devices or an adjacent monitoring zone to all of the electronic intelligent devices, wherein the processing unit is arranged to determine a conditional probability that the first event related data is a result of the event having occurred in an adjacent monitoring zone of all intelligent electronic devices; conditional probabilities for each intelligent electronic device that the first event related data is a result of the event having occurred in the primary monitoring zone of one of the intelligent electronic devices; conditional probabilities that the first event related data is a result of the event having occurred in a primary monitoring zone of more than one intelligent electronic device, each determined conditional probability thereby being associated with at least one event zone, and, based on the conditional probabilities, to determine whether the event occurred in at least one primary monitoring zone or in a non-primary monitoring zone.

According to one embodiment, the processing unit is arranged to determine a respective weighted probability value for each of the determined conditional probabilities based on prior probability that the event occurred in an adjacent monitoring zone for each intelligent electronic device, that the event occurred in a primary monitoring zone of one intelligent electronic device, that the event occurred in a primary monitoring zone for more than one intelligent electronic device, wherein the processing unit is arranged to determine that the event occurred in at least one primary monitoring zone or a non-primary monitoring zone based on the highest value of the weighted probabilities.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. It is to be noted that, although the steps of the methods presented herein are referred to by numbers; a particular step may for instance be called "a first step", the steps of any method disclosed herein do not have to be performed in the exact order disclosed, unless explicitly stated. Moreover, not all steps have to be executed within one physical system; the whole process can be broken down and distributed among multiple processors or IEDs. In particular, one of the IEDs can be designated as a master IED that receives input from all other IEDs and performs the final information synthesis.

BRIEF DESCRIPTION OF THE DRAWINGS

Specific embodiments of the inventive concept will now be described, by way of example, with reference to the accompanying drawings, in which.

DETAILED DESCRIPTION OF THE INVENTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
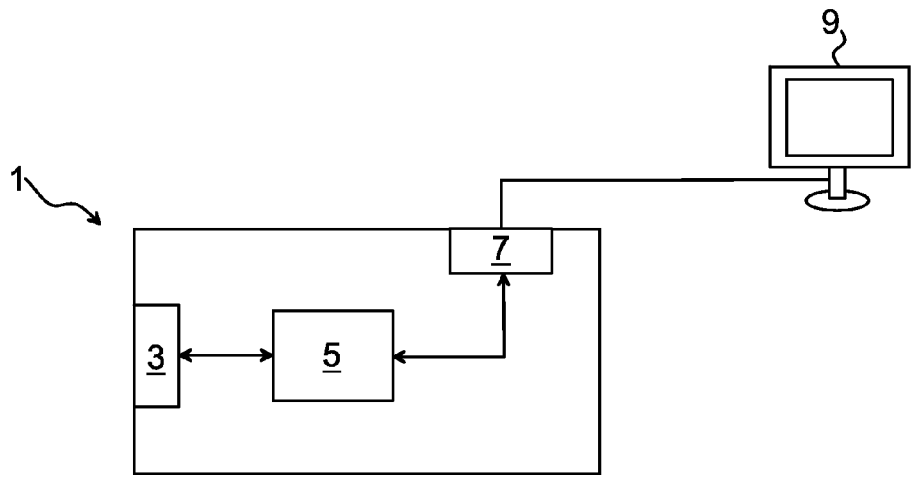
FIG. 1 shows a schematic view of a system for identifying at least one event zone subject to an event in a power distribution network.

FIG. 1 depicts a system 1 for identifying at least one event zone subject to an event in an electrical grid. System 1 may typically be used in a substation environment of a power distribution network or a power transmission network.

System 1 comprises an input unit 3, a processing unit 5, and an output unit 7. The input unit 3 is arranged to receive first event related data and second event related data from intelligent electronic devices (IEDs). The IEDs may for instance be arranged in a power distribution network or a power transmission network.

The processing unit 5 is arranged to process the first event related data and the second event related data. The processed first event related data and second event related data can be sent to the output unit 7 and further to a display device 9. The processed first event related data and processed second event related data can thereby be presented to e.g. an operator.

Event related data includes data relating to an event. The event related data can for instance be waveform data extracted from a measurement in a time range in which the event occurred, and processed thereafter. Event related data can also be a calculated probability that the event occurred in the monitoring zone of the IED which captured the measurement data, or in an adjacent monitoring zone. Furthermore, event related data can also be simple current or voltage measurement data of the event.

In one embodiment, the input unit 3 is arranged to receive command data from e.g. an operator. In this embodiment, the output unit 7 is arranged to send the command data, either processed by the processing unit 5 or unprocessed, to a communications network N shown in FIG. 2 for communication with for instance IEDs connected to the network N.

Figure 2:
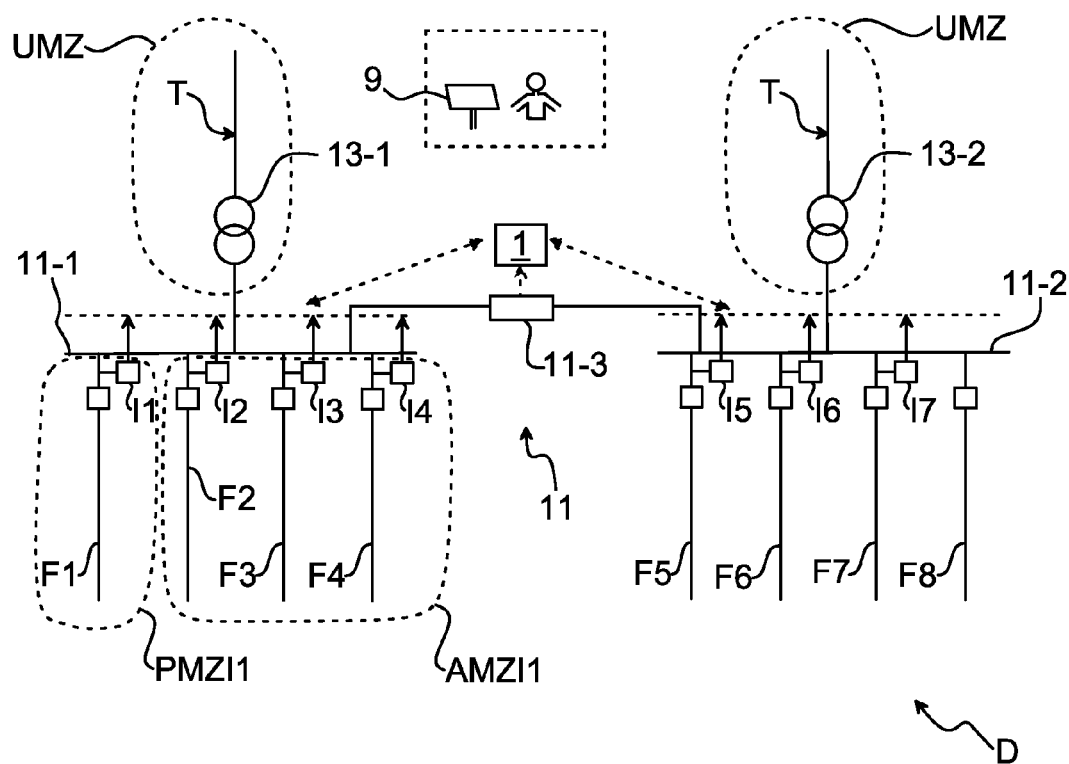
FIG. 2 shows a schematic view of power distribution network in a substation environment and the system in FIG. 1.

In the following the system 1 will be exemplified by arrangement in a power distribution network substation environment, as shown in FIG. 2. It is however to be noted that the system 1 may equally well be used in a power transmission network environment. FIG. 2 shows a portion of a power distribution network D in a substation environment, i.e. in the vicinity of a substation that forms an interface between the distribution network D and a transmission network T. A substation typically has two voltage levels. These voltage levels are referred to as a primary side and a secondary side, with the primary side being connected to the transmission network T, and the secondary side being connected to the distribution network D.

The example in FIG. 2 illustrates a busbar system 11 having a first bus 11-1 and a second bus 11-2 connectable via a bus tie 11-3. The first bus 11-1 is connected to the transmission network T via a first power transformer 13-1. The second bus 11-2 is connected to the transmission network T via the second power transformer 13-2.

The busbar system 11 is connectable to a plurality of feeders F1-F8 which form part of the distribution network D. Feeders F1-F4 are associated with the first bus 11-1 and feeders F5-8 are associated with the second bus 11-2.

The feeders F1-F8 are arranged to distribute power from the transmission network T to end customers such as commercial, industrial, and residential customers.

IEDs I1-I7 are arranged to monitor a respective feeder F1-F7. The IEDs process feeder signals such as current and voltage values. In case of an event, each IED which detects the event creates first event related data which is provided to the system 1 for processing by the processing unit 5. The IEDs I1-I7 and the system 1 can be connected to the communications network N such that they are able to communicate.

Each feeder F1-F8 defines a zone which can be monitored by one or more IEDs. In the example of FIG. 2, each of the feeders F1-F7 defines a zone which is monitored by a respective IED I1-I7.

Event zones can be divided into primary monitoring zones and non-primary monitoring zones. An event zone is a primary monitoring zone of that IED which is assigned to monitor that specific event zone. The remaining feeder zones of the bus are adjacent monitoring zones of that IED. Event zones which are adjacent monitoring zones to all IEDs and an event zone having a power level differing from a power level monitored by the intelligent electronic devices I1-I7 define the non-primary monitoring zone. In the example of FIG. 2, the event zone on the transmission network T side, which is not monitored by the IEDs I1-I7, is called the upstream monitoring zone UMZ, because it is in the transmission network T upstream of the busbar system 11.

Thus, according to the example of FIG. 2, the adjacent monitoring zones and the upstream monitoring zone of an IED together form a non-primary monitoring zone of that IED.

As an example, assuming that the breaker of the bus tie 11-3 is open, primary monitoring zone PMZI1 is the primary monitoring zone of IED I1 in FIG. 2, and its adjacent monitoring zone is AMZI1 which comprises feeders F2-F4 which are monitored by IEDs I2-I4. Thus, feeders F2-F4 and the upstream monitoring zone UMZ are the non-primary monitoring zones of IED 1. If the bus tie 11-3 breaker is closed, the adjacent monitoring zone of IED I1 would also include F5-F8.

According to the example in FIG. 2, feeder F8 on the second bus 11-2 is not monitored by any IED. It is however to be understood that all feeders can have at least one IED assigned to it for monitoring purposes.

Figure 3:
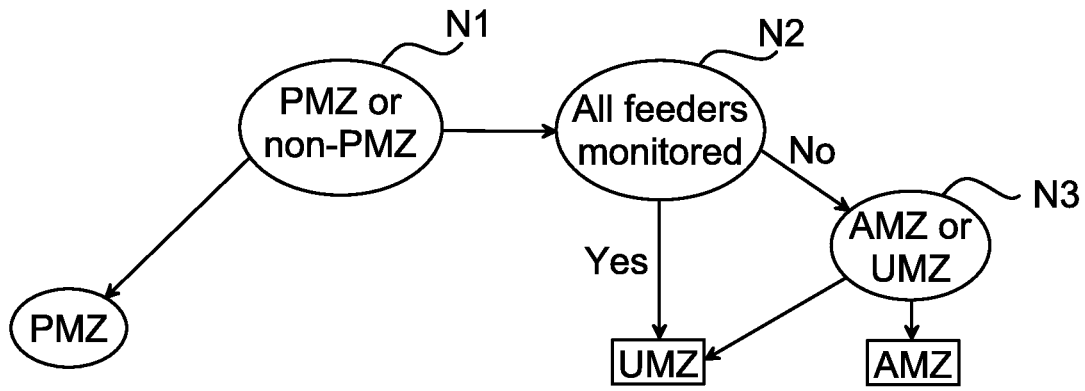
FIG. 3 shows a decision tree utilised for determining the event zone subject to the event.

FIG. 3 shows a decision tree utilised for determining the monitoring zone subject to an event. The decision tree has a first node N1, a second note N2, and a third node N3 where decisions are taken, as will be explained in detail in what follows.

In case of an event in the substation environment of the power distribution system, in the first node N1 it is determined whether the event occurred in at least one primary monitoring zone, i.e. that the event took place in at least one of the feeders which has an IED assigned to it for monitoring purposes, or if the event occurred in the non-primary monitoring zone.

Figure 4:
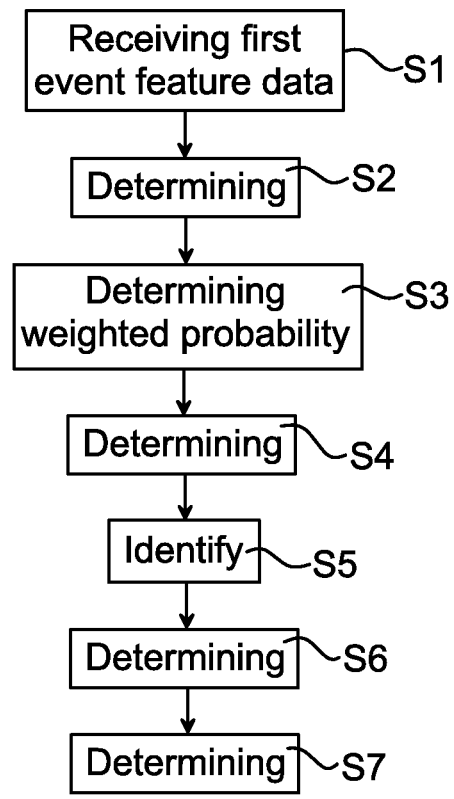
FIG. 4 is a flowchart of a method of identifying at least one event zone subject to an event in a power distribution network.

In case of a fault, in a first step S1, the input unit 3 of the system 1 receives first event related data from the IEDs I1-I7, as shown in FIG. 4.

Thus, according to the example in FIG. 2, first event related data is received by the system 1 from each IED I1-I7.

According to one embodiment, the first event related data comprises individual first event related data from those IEDs I1-I7 which together with their associated feeders F1-F7 form an electrically connected system with the busbar system 11. Thus, according to the example of FIG. 2, if the breaker of bus tie 11-3 is open, whereby the first bus 11-1 is not connected to the second bus 11-2 and hence do not form an electrically connected system in busbar system 11, the methods described herein are based on individual first and second event related data provided by IEDs connected to the same bus, e.g. either the IEDs I1-I4 connected to the first bus 11-1 or the IEDs I5-I7 connected to the second bus 11-2 in the example of FIG. 2. If several buses are connected by bus ties, event related data from all the IEDs of the connected buses are used in the methods described herein.

According to one embodiment, in case that the IEDs are able to determine respective probability values that the event is a primary monitoring zone event and that the event is an adjacent monitoring zone event, individual first event related data received from each IED I1-I7 comprises a probability value concerning the event being a primary monitoring zone event for an IED and a probability value concerning the event being an adjacent monitoring zone event for that IED. Such probabilities can be based on the density functions $P_{P,i}(x_i)$ and $P_{A,i}(x_i)$, i=1, ..., N with the argument $x_i$ being event feature data computed by an IED assigned to monitor feeder i based on event measurements associated with that IED. $P_{P,i}(x_i)$ is the density function for event feature data $x_i$ when the event takes place in the i:th feeder. $P_{A,i}(x_i)$ is the density function for the event feature data $x_i$ assuming that the event takes place in an adjacent feeder.

In case the IEDs do not have software capable of determining primary monitoring zone and adjacent monitoring zone probabilities for an event, according to one embodiment these probabilities can be determined by the system 1 based on first event related data which in this case is in the form of event measurements associated with each IED.

The computation of the respective event related data and event feature data in an IED is disclosed in U.S. application Ser. No. 13/155,249.

In a second step S2 it is determined whether the at least one monitoring zone subject to the event is a primary monitoring zone of at least one of the intelligent electronic devices or a non-primary monitoring zone for all of the intelligent electronic devices.

The second step S2 comprises determining:
a conditional probability that the first event related data is a result of the event having occurred in an adjacent monitoring zone of all intelligent electronic devices;
conditional probabilities for each intelligent electronic device that the first event related data is a result of the event having occurred in the primary monitoring zone of one of the intelligent electronic devices; and
conditional probabilities that the first event related data is a result of the event having occurred in a primary monitoring zone of more than one intelligent electronic device.

The determining of whether the event occurred in at least one primary monitoring zone or in a non-primary monitoring zone is based on the above-mentioned conditional probabilities.

I) involves determining the probability of the hypothesis $H_0$ that the event E occurred in the adjacent monitoring zone to all IEDs I1-I7. This means that the observed event belongs to a class $C_0$, i.e. an event zone which is adjacent to all IEDs I1-I7. For a substation environment having N IEDs, the conditional probability is determined by the joint density function:

$$Pr(x|C_0) = P_0(x_1, \ldots, x_N) = \prod_{i=1}^{N} P_{A,i}(x_i). \quad (1)$$

x denotes a feature vector comprising event extraction data $x_i$ from all the IEDs, i.e. $x=(x_1, \ldots x_N)$. The second equality in equation (1) holds due to the assumption that the individual first event feature data, i.e. the components of the feature vector x, are statistically independent.

II) involves determining the probability of the hypothesis $H_j, j=1, \ldots, N$ that the event E occurred in one and only one of the feeders being monitored by an IED, in the example of FIG. 2 feeders F1-F7. This means that the observed event belongs to a class $C_j, j=1, \ldots, N$, i.e. a primary monitoring zone of one of the IEDs. For a substation environment having N IEDs, the conditional probabilities are determined by the joint density functions:

$$Pr(x|C_j) = P_{P,j}(x_j) \prod_{\substack{i=1 \\ i \neq j}}^{N} P_{A,i}(x_i), \quad j=1, \ldots, N \quad (2)$$

This way, the conditional probability that the class is $C_j$, i.e. that the event occurred in only one primary monitoring zone for the feature vector x can be determined.

III) involves determining the probability of a plurality of hypotheses H that the event E occurred in more than one of the feeders being monitored by an IED, in the example of FIG. 2 more than one of the feeders F1-F7. This could for instance be the case if two or more feeders are damaged by an excavator. For this purpose, one hypothesis for each combination of feeders being monitored by an IED is tested. As an example, for the first bus I1-1 in FIG. 2, the possible combinations of a simultaneous event in two or more feeders monitored by a respective IED I1-I4 are: F1 and F2; F1 and F3; F1 and F4; F2 and F3; F2 and F4; F3 and F4; F1 and F2 and F3; F1 and F3 and F4; F2 and F3 and F4; F1 and F2 and F3 and F4.

For a substation environment having N IEDs, the conditional probabilities are determined by the joint density functions:

$$Pr(x|C_{j1,\ldots jN}) = P_{P,j1}(x_{j1}) \ldots P_{P,jN}(x_{jN}) \prod_{i \notin (j1 \ldots jN)}^{N} P_{A,i}(x_i). \quad (3)$$

Here $(j_1, \ldots j_N) \in I_q$ is the index set of all N combinations of the indexes and $C_{j1,\ldots jN}$ corresponds to classes of the different feeder combinations being monitored by an IED. Thus for example $C_{1,2,3}$ stands for the class that the event occurred simultaneously in feeders F1, F2 and F3.

Based on all the conditional probabilities determined under items I-III above, it can be determined whether the event occurred in at least one primary monitoring zone, or in a non-primary monitoring zone. This can in particular be determined by taking the maximum of all of the determined conditional probabilities.

According to one embodiment, in a third step S3, a respective weighted probability value for each of the determined conditional probabilities is determined. The weights are based on prior probability that the event occurred in an adjacent monitoring zone for each intelligent electronic device, that the event occurred in a primary monitoring zone of one intelligent electronic device, and that the event occurred in a primary monitoring zone for more than one intelligent electronic device. Hence a priori knowledge is incorporated in the calculations for determining whether the event occurred in at least one primary monitoring zone or in a non-primary monitoring zone. The prior probabilities can be divided into three groups:

Group 1: prior probabilities for upstream monitoring zone events and adjacent monitoring zone events when at least one feeder in the substation is not monitored.

Group 2: prior probabilities for single primary monitoring zone events.

Group 3: prior probabilities for multiple primary monitoring zone events.

The prior probabilities should add up to one, and there are as many prior probabilities as there are hypotheses. The prior probabilities are denoted by $\xi_k$. Each prior probability $\xi_k$ can be seen as a weight. According to one embodiment, each conditional probability determined under items I-III above, is multiplied by its respective prior probability to thereby obtain the weighted probabilities. Thus, for instance the weighted probability for class $C_0$ is $$D_0^{NB}(x) = \xi_0 \cdot Pr(x|C_0). \quad (4)$$

NB denotes naïve Bayes. The remaining weighted probabilities, i.e. the weighted probabilities for each hypothesis, are determined in a similar manner. The function $D_0^{NB}$ is called a discriminant function, and thus one discriminant function is created for each hypothesis. By determining each weighted probability, a Bayes classifier can be determined for the first node N1. The Bayes classifier denotes the maximum of all the discriminant functions. For four IEDs, the Bayes classifier is:

$$h^{NB}(x) = \underset{j \in I_1, (k,m) \in I_2, (n,p,q) \in I_3}{\arg\max} \{D_0^{NB}, D_j^{NB}, D_{k,m}^{NB}, D_{n,p,q}^{NB}, D_{1,2,3,4}^{NB}\}. \quad (5)$$

Here, $I_1$ denotes the index set $\{1, 2, 3, 4\}$, $I_2$ denotes the index set of all 2-combinations of numbers of the set $\{1, 2, 3, 4\}$, and $I_3$ denotes the index set of all 3-combinations of numbers of the set $\{1, 2, 3, 4\}$. Generally, the number $K_q$ of q-combinations is calculated by means of the formula $$K_q = \binom{N}{q}.$$

In embodiments which carry out the third step S3, in a fourth step S4 it is determined whether the event occurred in a primary monitoring zone or a non-primary monitoring zone is based on the highest value of the weighted probabilities. Each conditional probability and hence each weighted probability is typically associated with the underlying assumptions of being a primary monitoring zone of one or more IED. Hence, in one embodiment, in a fifth step S5, if it is determined that the event occurred in at least one primary monitoring zone, the at least one primary monitoring zone in which the event occurred is identified based on the association of the at least one primary monitoring zone with its associated weighted probability value or underlying discriminant function.

So far, the method steps in the first node N1 have been described. In the following the method steps of the second node N2 and the third node N3 will be described in more detail.

In the second node N2, if it has been determined that the event is a non-primary monitoring zone event and all the feeders are monitored by an IED, it is determined that the event occurred in the upstream monitoring zone. The operator can be presented with this information on the display device 9. Upstream events are however typically not under the responsibility of the same unit within the utility. Thus, normally no action from the operator is necessary, other than perhaps notifying the transmission network owner/operator.

In node N3 which is the case when the event occurred is in a non-primary monitoring zone and not all feeders are monitored by an IED, second event related data received from the IEDs is utilised for determining whether the event occurred in the upstream monitoring zone or in a feeder, such as feeder F8 in FIG. 2, which is not monitored by an IED. The second event related data can for instance be a respective feature calculated in a respective IED, for instance from an autocorrelated sequence of the isolated transient captured at the time of the event by applying linear discriminant function. Alternatively, the second event related data can comprise joint density functions provided by each IED, and using the above-mentioned feature of the isolated transient in its argument. These aspects are described in more detail in US patent application having U.S. application Ser. No. 13/155,249, e.g. on page 46, line 23 and onwards. In case the IEDs are not capable of determining the specific features to be provided with the second event related data, the system 1 may receive measurement data from the IEDs and process the measurement data accordingly. The second event related data can be received from the IEDs either about at the same time as the first event related data was received, or later. The first event related data and the second event related data may be subsets of a general event related data sent by each IED.

In a sixth step S6 a conditional probability that the first event related data is a result of the event having occurred in an adjacent monitoring zone for all intelligent electronic devices is determined and a conditional probability that the first event related data is a result of the event having occurred in the upstream monitoring zone is determined based on the second event related data.

The conditional probability that the event occurred in an adjacent monitoring zone for all intelligent electronic devices, i.e. an unmonitored feeder zone, is determined e.g. by means of the following joint density function:

$$Pr(x|C_A) = \prod_{i=1}^{N} U_{A,i}(y_i). \tag{6}$$

$C_A$ is the class that the event occurred in a feeder which is not monitored by any IEDs. $U_{A,i}(y_i)$ is the density function of an individual second event related data pertaining to an IED which is assigned to monitor the i:th feeder with the event taking place in an adjacent monitoring zone.

The conditional probability that the event occurred in the upstream monitoring zone is determined e.g. by means of the joint density function:

$$Pr(x|C_U) = \prod_{i=1}^{N} U_{U,i}(y_i). \tag{7}$$

$C_U$ is the class that the event occurred in a feeder which is not monitored by any IEDs. $U_{U,i}(y_i)$ is the density function of an individual second event related data pertaining to an IED which is assigned to monitor the i:th feeder with the event taking place in the upstream monitoring zone.

In a seventh step S7 it is determined whether the event occurred in an adjacent monitoring zone or the upstream monitoring zone based on the conditional probabilities $Pr(x|C_A)$ and $Pr(x|C_U)$.

According to one embodiment, a weighted probability value for each of the determined second event data conditional probabilities is determined based on prior probability that the event occurred in an adjacent monitoring zone for each intelligent electronic device and that the event occurred in the upstream monitoring zone. Hence a priori knowledge is incorporated in the calculations for determining whether the event occurred in an adjacent monitoring zone to all IEDs or in the upstream monitoring zone.

The prior probabilities should add up to one, and there are as many prior probabilities as there are hypotheses, in this case two. The prior probability that the event occurred in an adjacent monitoring zone to all IEDs is denoted by $\xi_A$. The prior probability that the event occurred in the upstream monitoring zone is denoted by $\xi_U$. Each prior probability $\xi_A$ and $\xi_U$ can be seen as a weight. According to one embodiment, the conditional probabilities $Pr(x|C_A)$ and $Pr(x|C_U)$ are multiplied by their respective prior probabilities $\xi_A$ and $\xi_U$ to obtain the weighted probabilities. Thus, the weighted probability for a specific feature vector value x for the classes $C_A$ and $C_U$ are $$D_A^{NB}(x) = \xi_A \cdot Pr(x|C_A), \text{ and} \tag{8}$$

$$D_U^{NB}(x) = \xi_U \cdot Pr(x|C_U) \text{ respectively.} \tag{9}$$

The functions $D_A^{NB}(x)$ and $D_U^{NB}(x)$ are called discriminant functions. By determining each weighted probability, a Bayes classifier can be determined for the third node N3. The Bayes classifier denotes the maximum of all the discriminant functions. The Bayes classifier is:

$$h^{NB}(x) = \underset{\{A,U\}}{\arg\max} \{D_A^{NB}, D_U^{NB}\}. \tag{10}$$

In one embodiment the seventh step S7 of determining whether the event occurred in an adjacent monitoring zone or upstream of the busbar system is based on the highest value of the weighted probabilities. Whether the event occurred in an adjacent monitoring zone to all IEDs or in the upstream monitoring zone is determined based on the association between the weighted probability values and their underlying hypotheses.

When the decision has been made in any of the first node N1, the second node N2 and the third node N3, a single conclusion describing the event can be presented on the display device 9 to thereby help the operator to determine the relevant mitigation actions.

The inventive concept has mainly been described above with reference to a few embodiments. However, as is readily appreciated by a person skilled in the art, other embodiments than the ones disclosed above are equally possible within the scope of the invention, as defined by the appended claims.

What is claimed is:

1. A method of identifying at least one event zone subject to an event in a busbar system comprising a plurality of feeders and a plurality of intelligent electronic devices monitoring at least some of the feeders, wherein the method comprises:
receiving first event related data from the intelligent electronic devices, and
determining whether the at least one event zone subject to the event is a primary monitoring zone of at least one of the intelligent electronic devices or a non-primary monitoring zone for all of the intelligent electronic devices, a primary monitoring zone of an intelligent electronic device being a monitoring zone which that intelligent electronic device is assigned to monitor, a non-primary monitoring zone being either an event zone having a power level which differs from the power level monitored by the intelligent electronic devices or an adjacent monitoring zone to all of the electronic intelligent devices,
wherein the determining comprises determining a conditional probability that the first event related data is a result of the event having occurred in an adjacent monitoring zone of all intelligent electronic devices, conditional probabilities for each intelligent electronic device that the first event related data is a result of the event having occurred in the primary monitoring zone of one of the intelligent electronic devices, conditional probabilities that the first event related data is a result of the event having occurred in a primary monitoring zone of more than one intelligent electronic device, each determined conditional probability thereby being associated with at least one event zone,
determining whether the event occurred in at least one primary monitoring zone or in a non-primary monitoring zone based on the conditional probabilities, and
determining a respective weighted probability value for each of the determined conditional probabilities based on prior probabiliy that the event occurred in an adjacent monitoring zone for each intelligent electronic device, that the event occurred in a primary monitoring zone of one intelligent electronic device, that the event occurred in a primary monitoring zone for more than one intelligent electronic device, wherein the step of determining whether the event occurred in a primary monitoring zone or a non-primary monitoring zone is based on the highest value of the weighted probabilities, wherein each prior probability is seen as a weight and each weighted probability value is obtained by multiplying a respective prior probability with the corresponding determined conditional probability.

2. The method as claimed in claim 1, comprising, in case the event occurred in at least one primary monitoring zone, identifying the at least primary monitoring zone in which the event occurred based on an association of the at least one primary monitoring zone with a weighted probability value.

3. The method as claimed in claim 1, comprising, in case the event occurred in a non-primary monitoring zone and all feeders are monitored by an intelligent electronic device, determining that the event occurred in the upstream monitoring zone.

4. The method as claimed in claim 1, comprising receiving second event related data, and in case the event occurred in a non-primary monitoring zone and not all feeders are monitored by an intelligent electronic device, determining a conditional probability that the first event related data is a result of the event having occurred in an adjacent monitoring zone for all intelligent electronic devices and a conditional probability that the first event related data is a result of the event having occurred in the upstream monitoring zone based on the second event related data, and determining whether the event occurred in an adjacent monitoring zone or the upstream monitoring zone based on the conditional probabilities.

5. The method as claimed in claim 4, comprising determining a weighted probability value for each of the determined second event related data conditional probabilities based on prior probability that the event occurred in an adjacent monitoring zone for each intelligent electronic device and that the event occurred in the upstream monitoring zone, wherein the step of determining whether the event occurred in an adjacent monitoring zone or upstream of the busbar system is based on the highest value of the weighted probabilities.

6. The method as claimed in claim 1, wherein the steps of determining the conditional probabilities involves determining a respective joint density function.

7. The method as claimed in claim 1, wherein the step of determining the weighted conditional probabilities involves determining a respective discriminant function.

8. The method as claimed in claim 1, wherein the determining of the conditional probabilities for each intelligent electronic device that the first event related data is a result of the event having occurred in the primary monitoring zone of more than one of the intelligent electronic devices comprises determining conditional probabilities for all primary monitoring zone combinations.

9. The method as claimed in claim 1, wherein the first event related data received from each intelligent electronic device comprises probabilities concerning the event being a primary monitoring zone event for that intelligent electronic device or an adjacent monitoring zone event for that intelligent electronic device.

10. The method as claimed in claim 1, wherein the system synthesizes data from multiple intelligent electronic devices and provides an operator with a single conclusion describing the event thereby helping the operator to determine mitigation actions.

11. A computer program product comprising computer-executable components run on a processing unit that includes a hardware processor which is included in a system and causing the system to perform a method of identifying at least one event zone subject to an event in a busbar system comprising a plurality of feeders and a plurality of intelligent electronic devices monitoring at least some of the feeders, wherein the method comprises:
receiving first event related data from the intelligent electronic devices, and
determining whether the at least one event zone subject to the event is a primary monitoring zone of at least one of the intelligent electronic devices or a non-primary monitoring zone for all of the intelligent electronic devices, a primary monitoring zone of an intelligent electronic device being a monitoring zone which that intelligent electronic device is assigned to monitor, a non-primary monitoring zone being either an event zone having a power level which differs from the power level monitored by the intelligent electronic devices or an adjacent monitoring zone to all of the electronic intelligent devices, wherein the determining comprises determining a conditional probability that the first event related data is a result of the event having occurred in an adjacent monitoring zone of all intelligent electronic devices, conditional probabilities for each intelligent electronic device that the first event related data is a result of the event having occurred in the primary monitoring zone of one of the intelligent electronic devices, conditional probabilities that the first event related data is a result of the event having occurred in a primary monitoring zone of more than one intelligent electronic device, each determined conditional probability thereby being associated with at least one event zone, determining whether the event occurred in at least one primary monitoring zone or in a non-primary monitoring zone based on the conditional probabilities, and determining a respective weighted probability value for each of the determined conditional probabilities based on prior probability that the event occurred in an adjacent monitoring zone for each intelligent electronic device, that the event occurred in a primaary monitoring zone of one intelligent electronic device, that the event occurred in a primary monitoring zone of more than one intelligent electronic device, wherein the step of determining whether the event occurred in a primary monitoring zone or a non-primary monitoring zone is base on the highest value of the weighted probabilities, wherein each prior probability is seen as a weight and each weighted probability value is obtained by multiplying a respective prior probability with the corresponding determined conditional probability.

12. A system for identifying at least one event zone subject to an event in a busbar system comprising a plurality of feeders and a plurality of intelligent electronic devices monitoring at least some of the feeders, wherein the system comprises:

an input unit having computer-executable components executing thereon and arranged to receive first event related data from the intelligent electronic devices, and a processing unit that includes a hardware processor having computer-executable components executing thereon and arranged to determine whether the at least one event zone subject to the event is a primary monitoring zone of at least one of the intelligent electronic devices or a non-primary monitoring zone for all of the intelligent electronic devices, a primary monitoring zone of an intelligent electronic device being a monitoring zone which that intelligent electronic device is assigned to monitor, a non-primary monitoring zone being either an event zone having a power level which differs from the power level monitored by the intelligent electronic devices or an adjacent monitoring zone to all of the electronic intelligent devices, wherein the processing unit is arranged to:

determine a conditional probability that the first event related data is a result of the event having occurred in an adjacent monitoring zone of all intelligent electronic devices, conditional probabilities for each intelligent electronic device that the first event related data is a result of the event having occurred in the primary monitoring zone of one of the intelligent electronic devices, conditional probabilities that the first event related data is a result of the event having occurred in a primary monitoring zone of more than one intelligent electronic device, each determined conditional probability thereby being associated with at least one event zone, based on the conditional probabilities, to determine whether the event occurred in at least one primary monitoring zone or in a non-primary monitoring zone, and to determining a respective weighted probability value for each of the determined conditional probabilities based on prior probabiliy that the event occurred in an adjacent monitoring zone for each intelligent electronic device, that the event occurred in a primary monitoring zone of one intelligent electronic device, that the event occurred in a primary monitoring zone of more than one intelligent electronic device, wherein the processing unit is arranged to determine that the event occurred in at least one primary monitoring zone or a non-primary monitoring zone is base on the highest value of the weighted probabilities, wherein each prior probability is seen as a weight and each weighted probability value is obtained by multiplying a respective prior probability with the corresponding determined conditional probability.

13. A method of identifying at least one event zone subject to an event in a busbar system comprising a plurality of feeders and a plurality of intelligent electronic devices monitoring at least some of the feeders, wherein the method comprises:

receiving first event related data from the intelligent electronic devices, and determining whether the at least one event zone subject to the event is a primary monitoring zone of at least one of the intelligent electronic devices or a non-primary monitoring zone for all of the intelligent electronic devices, a primary monitoring zone of an intelligent electronic device being a monitoring zone which that intelligent electronic device is assigned to monitor, a non-primary monitoring zone being either an event zone having a power level which differs from the power level monitored by the intelligent electronic devices or an adjacent monitoring zone to all of the electronic intelligent devices, wherein the determining comprises determining a conditional probability that the first event related data is a result of he event having occurred in an adjacent monitoring zone of all intelligent electronic devices, conditional probabilities for each intelligent electronic device that the first event related data is a result of the event having occurred in the primary monitoring zone of one of the intelligent electronic devices, conditional probabilities that the first event related data is a result of the event having occurred in a primary monitoring zone of more than one intelligent electronic device, each determined conditional probability thereby being associated with at least one event zone, determining whether the event occurred in at least one primary monitoring zone or in a non-primary monitoring zone based on the conditional probabilities, receiving second event related data, and in case the event occurred in a non-primary monitoring zone and not all feeders are monitored by an intelligent electronic device, determining a conditional probability that the first event related data is a result of the event having occurred in an adjacent monitoring zone for all intelligent electronic devices and a conditional probability that the first event related data is a result of the event having occurred in the upstream monitoring zone based on the second event related data, and determining whether the event occurred in an adjacent monitoring zone or the upstream monitoring zone based on the conditional probabilities, and determining a weighted probability value for each of the determined second event related data conditional probabilities based on prior probability that the event occurred in an adjacent monitoring zone for each intelligent electronic device and that the event occurred in the upstream monitoring zone, wherein the step of determining whether the event occurred in an adjacent monitoring zone or upstream of the busbar system is based on the highest value of the weighted probabilities.

14. The method as claimed in claim 13, comprising determining a respective weighted probability value for each of the determined conditional probabilities based on prior probability that the event occurred in an adjacent monitoring zone for each intelligent electronic device, that the event occurred in a primary monitoring zone of one intelligent electronic device, that the event occurred in a primary monitoring zone for more than one intelligent electronic device, wherein the step of determining whether the event occurred in a primary monitoring zone or a non-primary monitoring zone is based on the highest value of the weighted probabilities.

15. The method as claimed in claim 13, comprising, in case the event occurred in at least one primary monitoring zone, identifying the at least primary monitoring zone in which the event occurred based on an association of the at least one primary monitoring zone with a weighted probability value.

16. The method as claimed in claim 13, comprising, in case the event occurred in a non-primary monitoring zone and all feeders are monitored by an intelligent electronic device, determining that the event occurred in the upstream monitoring zone.

17. The method as claimed in claim 13, wherein the steps of determining the conditional probabilities involves determining a respective joint density function.

18. The method as claimed in claim 13, wherein the step of determining the weighted conditional probabilities involves determining a respective discriminant function.

19. The method as claimed in claim 13, wherein the determining of the conditional probabilities for each intelligent electronic device that the first event related data is a result of the event having occurred in the primary monitoring zone of more than one of the intelligent electronic devices comprises determining conditional probabilities for all primary monitoring zone combinations.

20. The method as claimed in claim 13, wherein the first event related data received from each intelligent electronic device comprises probabilities concerning the event being a primary monitoring zone event for that intelligent electronic device or an adjacent monitoring zone event for that intelligent electronic device.

* * * * *